Dec. 8, 1953          L. BERTELE          2,661,660
OBJECTIVE COMPRISING THREE LENS MEMBERS AXIALLY AIR
SEPARATED FROM EACH OTHER IN OPTICAL ALIGNMENT
Filed Jan. 19, 1952
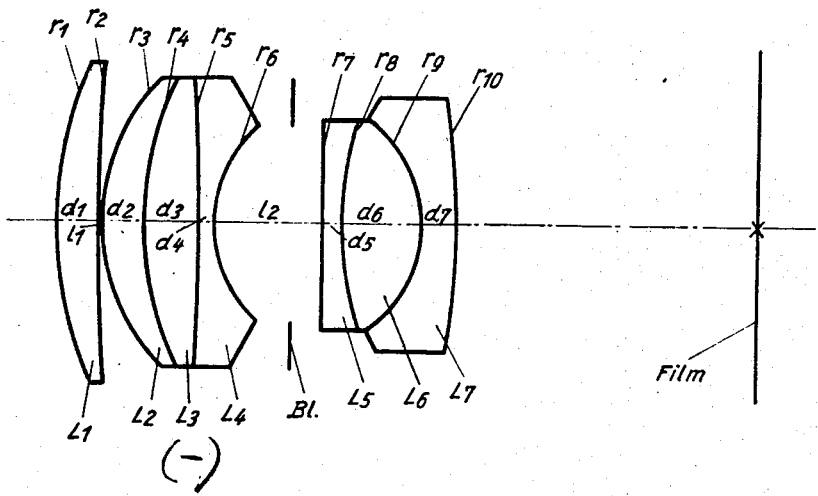
Inventor:
Ludwig Bertele Patented Dec. 8, 1953

2,661,660

UNITED STATES PATENT OFFICE 2,661,660

OBJECTIVE COMPRISING THREE LENS MEMBERS AXIALLY AIR SEPARATED FROM EACH OTHER IN OPTICAL ALIGNMENT

Ludwig Bertele, Heerbrugg, Switzerland

Application January 19, 1952, Serial No. 267,271

1 Claim. (Cl. 88—57)

The present invention is relative to an objective substantially comprising three lens members axially separated from each other by air spaces of which two converging members include one member bent towards the object. The air space separating the first member from the second one has the shape of a diverging lens bent towards the object, and the air space separating the second member from the third member has the form of a converging lens with its minor bent surface directed towards the image. The first member generally is a single converging lens. The second member consists of single lenses being either cemented together or separated by small air spaces, the one of said lenses having a diverging power. The third converging lens member has a cemented surface strongly bent towards the image with a refractive index being greater at the concave side of this surface than at the convex side. With this cemented surface the problem of diminishing the spherical zonal image errors and of eliminating the chromatic image errors to be solved.

Known objectives of this kind result with an aperture ratio of 1:2 in an effective image angle of ±15°. Beyond this limit there already arise chromatic image errors. Investigations aiming to further amplify the image angle with this sequence of lenses proved it to be more advantageous according to the present invention to satisfy the following three conditions simultaneously: firstly to choose the axial thickness of the second lens component member between $0.12 \cdot f$ and $0.26 \cdot f$, f being the total focal length of the objective, secondly to choose the values of $n_1$; $v_1$ and $n_2$; $v_2$ so that the product of $$(n_1-1) \cdot (n_2-1) \cdot (v_1+v_2)$$

is greater than 45.0 and smaller than 60.0, and thirdly to choose the number of refractive index for the $d$-line as regards the negative lens of the second member less than 1.680. With this it is possible to reduce the axial thickness of the second member or to diminish the meniscus shaped deflection without detrimentally influencing the factor decisive for the image flattening whereby the conditions are embodied for amplifying the effective image angle.

Two examples of objectives according to the present invention with an aperture ratio of 1:2 and with an effective image angle of ±17.5° and of the focal length of 100 mm. are given in the following.

The drawing shows a section taken along the axis of an objective embodying this invention, which drawing serves for illustrating both said examples.

$L_1$ is the lens representing the first member.

$L_2$, $L_3$ and $L_4$ are lenses cemented together which constitute the second member.

$L_5$, $L_6$ and $L_7$ are likewise cemented together and constitute the third member.

In Example 1 the axial thickness of the second lens component is $0.184 \cdot f$. The result of the product of $(n_1-1) \cdot (n_2-1) \cdot (v_1+v_2)$ amounts to 47.8. The refractive index of the negative lens $L_4$ of the second member amounts to 1.65044.

In Example 2 the axial thickness of the second lens component is $0.184 \cdot f$. The result of the product of $(n_1-1) \cdot (n_2-1) \cdot (v_1+v_2)$ amounts to 48.1. The refractive index of the negative lens $L_4$ of the second member amounts to 1.6364.

Example 1

| | | | $n_d$ | $v$ |
|---|---|---|---|---|
| $L_1$ | $r_1=+60.00$ | $d_1=6.67$ | 1.64192 | 58.0 |
| | $r_2=+320.00$ | $l_1=0.33$ | | |
| $L_2$ | $r_3=+31.99$ | $d_2=7.07$ | 1.64192 | 58.0 |
| $L_3$ | $r_4=+50.67$ | $d_3=8.80$ | 1.46661 | 64.5 |
| $L_4$ | $r_5=-613.34$ | $d_4=2.53$ | 1.65044 | 34.6 |
| | $r_6=+20.75$ | $l_2=17.33$ | | |
| $L_5$ | $r_7=-1200.00$ | $d_5=3.20$ | 1.50137 | 56.5 |
| $L_6$ | $r_8=+54.00$ | $d_6=12.93$ | 1.65400 | 53.8 |
| $L_7$ | $r_9=-20.01$ | $d_7=5.47$ | 1.58240 | 56.1 |
| | $r_{10}=-125.84$ | | | |

L being the lenses, the respective indices defining the order of sequence;

r being the radii of the refracting surfaces, the respective indices likewise defining the order of sequence.

Example 2

| | | | $n_d$ | $v$ |
|---|---|---|---|---|
| $L_1$ | $r_1=+59.53$ | $d_1=6.67$ | 1.64135 | 58.5 |
| | $r_2=+312.04$ | $l_1=0.33$ | | |
| $L_2$ | $r_3=+32.20$ | $d_2=7.07$ | 1.64135 | 58.5 |
| $L_3$ | $r_4=+51.07$ | $d_3=8.67$ | 1.46450 | 65.7 |
| $L_4$ | $r_5=-453.33$ | $d_4=2.67$ | 1.63640 | 35.4 |
| | $r_6=+20.67$ | $l_2=17.33$ | | |
| $L_5$ | $r_7=-1173.4$ | $d_5=3.33$ | 1.51742 | 52.2 |
| $L_6$ | $r_8=+52.67$ | $d_6=12.80$ | 1.65350 | 53.4 |
| $L_7$ | $r_9=-19.98$ | $d_7=5.47$ | 1.58100 | 55.2 |
| | $r_{10}=-125.65$ | | | |

L being the lenses, the respetcive indices defining the order of sequence;

r being the radii of the refracting surfaces, the respective indices likewise defining the order of sequence.

I claim:

Objective substantially comprising three lens component members axially separated from each other by air spaces of which the first said member directed towards the object is of convergent power and has a refractive index $n_1$ for the $d$-line and an Abbe Number $v_1$, the second said member is bent towards the object and composed of single lenses the first lens of which adjacent the said first member having a refractive index $n_2$ and an Abbe Number $v_2$, and another lens of said second member being of divergent power, and the third said member is of convergent power and includes two lenses cemented together, the cemented surface being strongly bent towards the image, the refractive index of the lens adjacent the concave side of said surface being higher than the index of the lens adjacent its convex side, the first air space being in the form of a diverging lens with its less curved surface directed towards the object and the second air space being of the form of a converging lens with its less curved surface directed towards the image, the axial thickness of the second said lens component member being chosen between $0.12 \cdot f$ and $0.26 \cdot f$, f being the total focal length of the objective, the values of $n_1$; $v_1$ and $n_2$; $v_2$ being chosen so that the product of $(n_1-1) \cdot (n_2-1) \cdot (v_1+v_2)$ is greater than 45.0 and smaller than 60.0, and the number of refractive index for the $d$-line of said diverging lens of the second said lens component member being chosen smaller than 1.680.

LUDWIG BERTELE.

References Cited in the file of this patent

UNITED STATES PATENTS

| Number | Name | Date |
|---|---|---|
| 1,975,678 | Bertele | Oct. 2, 1934 |
| 2,124,356 | Rayton | July 19, 1938 |
| 2,254,511 | Bertele | Sept. 2, 1941 |

FOREIGN PATENTS

| Number | Country | Date |
|---|---|---|
| 499,290 | Great Britain | Jan. 20, 1939 |
| 673,861 | Germany | Apr. 1, 1939 |